(No Model.) 2 Sheets—Sheet 1.

G. H. EDWARDS.
APPARATUS FOR SEPARATING THE SKINS FROM THE PULP OF POTATOES.

No. 258,730. Patented May 30, 1882.

Witnesses:
Geo. E. Shaw
Charles Bryant

Inventor:
George H. Edwards (No Model.) 2 Sheets—Sheet 2.

G. H. EDWARDS.
APPARATUS FOR SEPARATING THE SKINS FROM THE PULP OF POTATOES.

No. 258,730. Patented May 30, 1882.

Witnesses: Geo. E. Shaw, Charles Bryant

Inventor: George H. Edwards

UNITED STATES PATENT OFFICE.

GEORGE H. EDWARDS, OF CHICAGO, ILLINOIS.

APPARATUS FOR SEPARATING THE SKINS FROM THE PULP OF POTATOES.

SPECIFICATION forming part of Letters Patent No. 258,730, dated May 30, 1882.

Application filed June 23, 1881. (No model.)

*To all whom it may concern:*

Be it known that I, GEORGE H. EDWARDS, a citizen of the United States, residing at Chicago, Cook county, State of Illinois, have invented a new and useful apparatus for separating the skins from the pulp of cooked potatoes or yams in preparing them for eating or drying and preserving, of which the following is a specification.

The object of my invention is to rapidly separate the pulp from the skins after the vegetable has been cooked. I attain this object by the apparatus illustrated in the accompanying drawings, in which—

Figure 1:
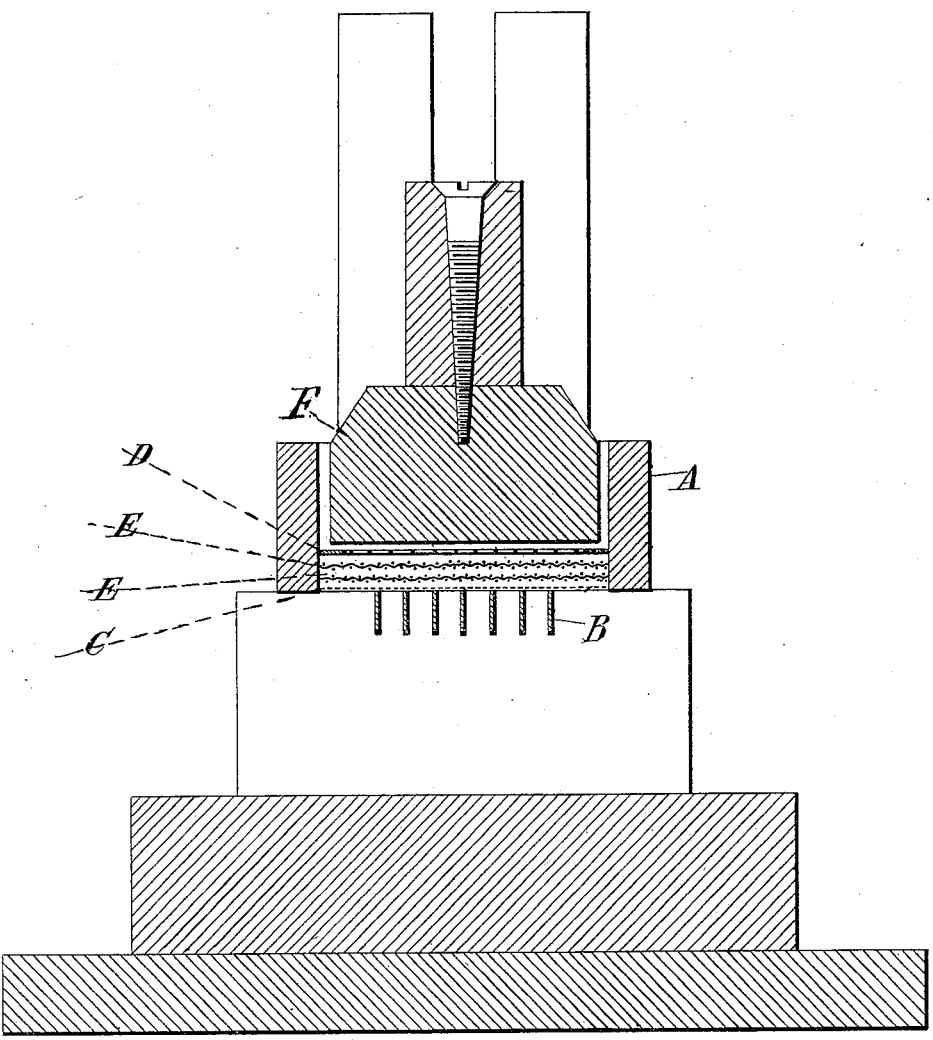

Figure 1 is a vertical sectional view of a press with the apparatus placed therein.

Figure 2:
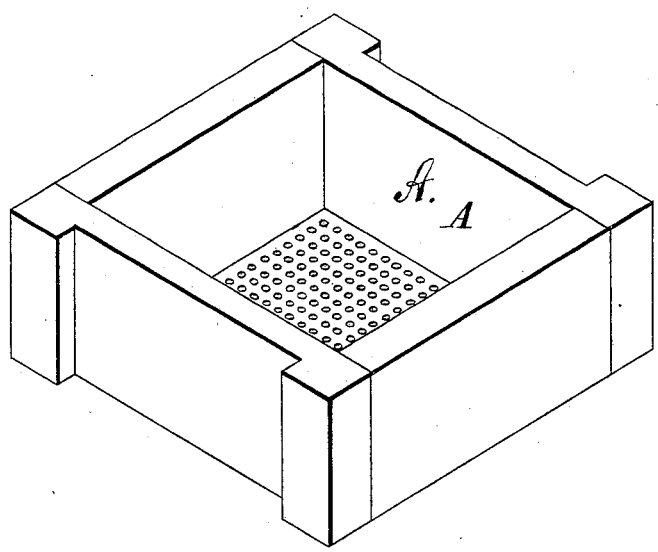

Fig. 2, letter A is a rectangular box or hopper removed from its place in the press; and it is also shown in its place in the press in Fig. 1 as marked A.

Figure 3:
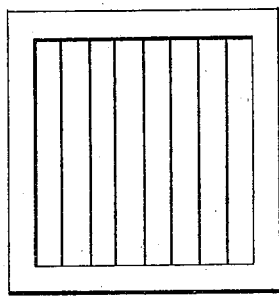

Fig. 3, letter D is a removable frame of parallel wires intended to be laid within the box, and it is also shown in place in Fig. 1, and marked D.

Figure 4:
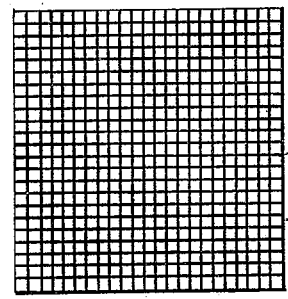

Fig. 4, letter E is a removable sheet of woven wire intended to be laid within the box. Two of such sheets are shown in their places within the box in Fig. 1, and are marked E and E.

Figure 5:
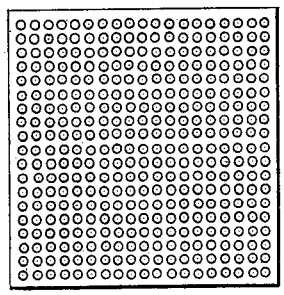

Fig. 5, letter C is a perforated plate of metal or other suitable material, intended to form a bottom to the box A, which may be attached to the sides of the box or laid within the sides of the box; and it is also shown in position in Fig. 1, and marked C, and as resting on the open cross-bars marked B in Fig. 1.

Similar letters refer to similar parts throughout the several views.

The box or hopper A is placed in any convenient form of press, having cross-bars or other suitable support for the box to rest on. The perforated plate C is laid within the box, and rests on the cross bars B. Above the perforated plate are laid one or more removable sheets of woven wire, as E E, Fig. 1, and one or more sheets or frames of parallel wires, one of which is shown in Fig. 1, and is marked D, or a mixture of such sheets and frames laid loosely in the box, and of such number as the nature of the vegetable requires to remove the skins from them—the potatoes or yams. Upon these wires are laid the cooked potatoes or yams, and a follower marked F, Fig. 1, which is a block that nearly fits the box, is brought to bear on the vegetable with pressure that is applied to the follower by any convenient form of mechanism. (No form shown in drawings.) The pressure forces the pulp through the interstices of the wires and the perforations of the plate C, and the pulp falls into receptacles placed to catch it, while the skins remain on the removable wires above the perforated plate, which can be lifted out to be cleaned, while other wires are laid in their place for use. It is obvious that the box or hopper and removable linings can be of a circular or other form, if desired.

What I claim as new, and desire to secure by Letters Patent, is—

1. The combination of a box or hopper having an open grating or perforated bottom with a removable lining of one or more sheets of woven wire or frames of parallel wires, or a mixture of such sheets and frames, either being of uniform size of mesh and used together or separately or of a varying size of mesh to suit the quality of the vegetable, for the purpose of removing the skins from cooked potatoes or yams, substantially as set forth.

2. A box or hopper having an open bottom formed of a grating or perforated plate and a lining of one or more sheets of woven wire or frames of parallel wires, or a mixture of such sheets and frames, with a press used to force the pulp of cooked potatoes or yams through such lining for the purpose of removing the skins from the vegetables, substantially as set forth.

GEORGE H EDWARDS.

In presence of—
GEORGE E. SHAW,
CHARLES BRYANT.